(12) United States Patent (10) Patent No.: US 8,169,231 B2
Berkley (45) Date of Patent: May 1, 2012

(54) SYSTEMS, METHODS, AND APPARATUS FOR QUBIT STATE READOUT

(75) Inventor: Andrew Joseph Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 791 days.

(21) Appl. No.: 12/236,040

(22) Filed: Sep. 23, 2008

(65) Prior Publication Data

US 2009/0078931 A1 Mar. 26, 2009

Related U.S. Application Data

(60) Provisional application No. 60/974,743, filed on Sep. 24, 2007.

(51) Int. Cl.
*H03K 19/195* (2006.01)
(52) U.S. Cl. ...................................... 326/4; 326/1; 326/7
(58) Field of Classification Search .................. 326/1–7
See application file for complete search history.

(56) References Cited

U.S. PATENT DOCUMENTS

| | | | |
|---|---|---|---|
| 4,275,314 A | 6/1981 | Fulton | 307/462 |
| 6,784,451 B2 | 8/2004 | Amin et al. | 257/34 |
| 6,838,694 B2 | 1/2005 | Esteve et al. | 257/34 |
| 6,984,846 B2 * | 1/2006 | Newns et al. | 257/31 |
| 7,335,909 B2 | 2/2008 | Amin et al. | 257/34 |
| 7,843,209 B2 | 11/2010 | Berkley | 326/7 |
| 7,876,248 B2 | 1/2011 | Berkley et al. | 341/133 |
| 8,018,244 B2 | 9/2011 | Berkley | 326/7 |
| 2002/0060635 A1 | 5/2002 | Gupta | 341/133 |
| 2005/0082519 A1 | 4/2005 | Amin et al. | 257/13 |
| 2006/0147154 A1 | 7/2006 | Thom et al. | 385/37 |
| 2006/0225165 A1 | 10/2006 | Maassen van den Brink et al. | 977/933 |
| 2006/0248618 A1 | 11/2006 | Berkley | 977/700 |
| 2009/0082209 A1 * | 3/2009 | Bunyk et al. | 505/190 |
| 2011/0065586 A1 * | 3/2011 | Maibaum et al. | 505/170 |

FOREIGN PATENT DOCUMENTS

SU 539333 12/1976

OTHER PUBLICATIONS

Berkley, "Adiabatic Superconducting Qubit Logic Devices and Methods," U.S. Appl. No. 60/913,980, filed Apr. 25, 2007, 49 pages.
Berkley et al., "Scalable Superconducting Flux Digital-to-Analog Conversion Using a Superconducting Inductor Ladder Circuit," U.S. Appl. No. 60/917,884, filed May 14, 2007, 39 pages.

(Continued)

*Primary Examiner* — Shawki S Ismail
*Assistant Examiner* — Dylan White
(74) *Attorney, Agent, or Firm* — Seed IP Law Group PLLC

(57) ABSTRACT

A superconducting readout system includes a computation qubit; a measurement device to measure a state of the computation qubit; and a latch qubit that mediates communicative coupling between the computation qubit and the measurement device. The latch qubit includes a qubit loop that includes at least two superconducting inductors coupled in series with each other; a compound Josephson junction that interrupts the qubit loop that includes at least two Josephson junctions coupled in series with each other in the compound Josephson junction and coupled in parallel with each other with respect to the qubit loop; and a first clock signal input structure to couple clock signals to the compound Josephson junction.

30 Claims, 8 Drawing Sheets

OTHER PUBLICATIONS

Bunyk et al., "Systems, Methods, and Apparatus for Scalable Superconducting Flux Digital-to-Analog Converter," U.S. Appl. No. 60/917,891, filed May 14, 2007, 53 pages.

Maibaum et al., "Systems, Methods and Apparatus for a Differential Superconducting Flux Digital-to-Analog Converter," U.S. Appl. No. 60/975,487, filed Sep. 26, 2007, 41 pages.

Berkley, "Architecture for Local Programming of Quantum Processor Elements Using Latching Qubits," Amendment After Allowance filed Oct. 19, 2010 for U.S. Appl. No. 12/109,847, 7 pages.

Berkley, "Architecture for Local Programming of Quantum Processor Elements Using Latching Qubits," Office Action mailed Dec. 8, 2010 for U.S. Appl. No. 12/909,682, 6 pages.

Berkley, "Architecture for Local Programming of Quantum Processor Elements Using Latching Qubits," Amendment filed Apr. 4, 2011 for U.S. Appl. No. 12/909,682, 11 pages.

Harris et al., "Sign and Magnitude Tunable Coupler for Superconducting Flux Qubits," arXiv:cond-mat/0608253 v1, Aug. 11, 2006, 5 pages.

U.S. Appl. No. 12/013,192, filed Jan. 11, 2008, Rose et al.
U.S. Appl. No. 12/017,995, filed Jan. 22, 2008, Harris.
U.S. Appl. No. 12/109,847, filed Apr. 25, 2008, Berkley.
U.S. Appl. No. 60/913,980, filed Apr. 25, 2007, Berkley.
U.S. Appl. No. 60/986,554, filed Nov. 8, 2007, Choi.
U.S. Appl. No. 61/039,710, filed Mar. 26, 2008, Maibaum et al.

Blatter et al., "Design aspects of superconducting-phase quantum bits," *Physical Review B* 63:174511-1-174511-9, 2001.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Feynman, "Simulating Physics with Computers," *International Journal of Theoretical Physics* 21(6/7):467-488, 1982.

Friedman et al., "Quantum superposition of distinct macroscopic states," *Nature* 406:43-46, Jul. 6, 2000.

Hioe et al., *Quantum Flux Parametron—A Single Quantum Flux Superconducting Logic Device*, World Scientific Publishing Co. Pte. Ltd., Singapore, 1991, pp. 23-41.

Il'ichev et al., "Continuous Monitoring of Rabi Oscillations in a Josephson Flux Qubit," *Physical Review Letters* 91(9):097906-1-097906-4, week ending Aug. 29, 2003.

Inokuchi et al., "Analog Computation Using Quantum-Flux Parametron Devices," *Physica C* 357-360:1618-1621, 2001.

Likharev et al., "Reversible Conveyer Computation in Array of Parametric Quantrons," *IEEE Transactions on Magnetics MAG-21*(2):947-950, 1985.

Likharev, "Classical and Quantum Limitations on Energy Consumption in Computation," *International Journal of Theoretical Physics* 21(3/4):311-326, 1982.

Likharev, "Dynamics of Some Single Flux Quantum Devices: I. Parametric Quatron," *IEEE Transactions on Magnetics MAG-13*(1):242-244, 1977.

Makhlin et al., "Quantum-State Engineering with Josephson-Junction Devices," *Reviews of Modern Physics* 73(2):357-400, Apr. 2001.

Mooij et al., "Josephson Persistent-Current Qubit," *Science* 285:1036-1039, Aug. 13, 1999.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B* 60(22):15 398-15 413, Dec. 1, 1999.

Semenov et al., "Classical and Quantum Operation Modes of the Reversible Logic Circuits," Department of Physics and Astronomy, Stony Brook University, Stony Brook, New York, Presentation, Dec. 2006, 29 pages.

Shor, "Introduction to Quantum Algorithms," AT&T Labs—Research, arXiv:quant-ph/0005003 v2, pp. 1-17, Jul. 6, 2001.

\* cited by examiner

SYSTEMS, METHODS, AND APPARATUS FOR QUBIT STATE READOUT

CROSS REFERENCE TO RELATED APPLICATIONS

This application claims benefit under 35 U.S.C. 119(e) of U.S. Provisional Patent Application Ser. No. 60/974,743, filed Sep. 24, 2007, entitled "Systems, Methods, and Apparatus for Qubit State Readout", which is incorporated herein by reference in its entirety.

BACKGROUND

1. Field

The present systems, methods, and apparatus relate to the use of latch qubits in reading out states of computation qubits.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. Nos. 6,838,694 and 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, *Science* 285, 1036; and Orlando et al, 1999, *Phys. Rev.* B 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junctions are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing," and U.S. Provisional Patent Application Ser. No. 61/039,710, filed Mar. 26, 2008 and entitled "Systems, Devices, And Methods For Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Quantum Flux Parametron

The quantum flux parametron (QFP) is a superconducting Josephson junction device similar in structure to the compound rf-SQUID. The name "quantum flux parametron", however, encompasses both the operation and the structure of the Josephson junction device, not simply structure alone. See e.g., Hioe and Goto, *Quantum Flux Parametron—A Single Quantum Flux Superconducting Logic Device*, World Scientific Publishing Co. Pte. Ltd., Singapore (1991), pp. 23-41. A particular potential energy curve may be generated with a QFP device. This potential energy curve may resemble a "W" where the central peak or "barrier" is adjustable in height, as are the independent depths of the two wells on either side of the central barrier. In superconducting circuits, the QFP may be implemented as a magnetic flux-based logic device. Thus, QFP devices may be used to implement superconducting shift registers, superconducting memory arrays, superconducting adders, superconducting flip-flops, and other logic-based circuits.

From the quantum mechanical perspective, it is possible to adjust the height of the central barrier slowly enough that the system is not excited beyond the desired ground state. This is an example of adiabatic evolution in a quantum system. Thus, while existing damped QFP devices are designed for operation at high switching speeds (greater than ~20 GHz), the present systems, methods and apparatus provide undamped QFP-like devices for use in superconducting circuits where heat dissipation must be controlled. Operation of the present systems, methods and apparatus will generally be controlled adiabatically. Throughout the remainder of this specification and the appended claims, the terms "adiabatic", "adiabatically" and "adiabatic frequency" are used to describe frequencies, f, that satisfy:

$$f \le \frac{1}{2\pi\sqrt{LC}}$$

Where L is the loop inductance and C is the capacitance of the Josephson junction. Those of skill in the art will appreciate that for most of the exemplary circuits described herein, switching speeds will be less than about 20 GHz.

Latch Qubits

Systems, methods and apparatus for the use of a superconducting qubit as a latching device are described in U.S. patent application Ser. No. 12/109,847. In brief, these devices represent a novel application of superconducting qubit circuits. A superconducting qubit itself may resemble an undamped QFP-like device and, when controlled appropriately, may be used to produce many similar logic-based circuits. The present systems, methods and apparatus describe the application of latch qubits in reading out the state of at least one component in a superconducting quantum processor.

BRIEF SUMMARY

At least one embodiment may be summarized as a superconducting readout system including a computation qubit; a measurement device to measure a state of the computation qubit; and a first latch qubit comprising: a qubit loop formed by a first closed superconducting current path that includes at least two superconducting inductors coupled in series with each other in the qubit loop; a split junction loop or compound Josephson junction that interrupts the qubit loop, the compound Josephson junction formed by a second closed superconducting current path that includes at least two Josephson junctions coupled in series with each other in the compound Josephson junction and coupled in parallel with each other with respect to the qubit loop; and a first clock signal input structure configured to communicatively couple clock signals to the compound Josephson junction; wherein at least one of the computation qubit and the measurement device is communicatively coupled to the first latch qubit such that the first latch qubit mediates the communicative coupling between the computation qubit and the measurement device.

The computation qubit may be a superconducting qubit, for example a superconducting flux qubit, superconducting charge qubit, superconducting phase qubit, or superconducting hybrid qubit. The measurement device may include a magnetometer. The communicative coupling between the first latch qubit and at least one of the computation qubit and the measurement device may include inductive coupling. The first clock signal input structure may be configured to couple a clock signal at an approximately adiabatic frequency. The adiabatic frequency may be below about 20 GHz. An approximately constant clock signal may be applied to the compound Josephson junction of the first latch qubit and the parameters of the at least two Josephson junctions in the compound Josephson junction may be selected such that a signal that is coupled to the qubit loop of the first latch qubit produces a corresponding signal of greater magnitude that is coupled from the qubit loop of the first latch qubit. The superconducting readout system may further include at least a second latch qubit communicatively coupled in series with the first latch qubit, wherein the computation qubit and the measurement device are each communicatively coupled to at least one of the first and the second latch qubit such that the first and the second latch qubits mediate the communicative coupling between the computation qubit and the measurement device. The first and at least the second latch qubits may each be communicatively coupled to a respective adiabatic clock signal line.

At least one embodiment may be summarized as a superconducting readout system including a plurality of computation qubits; a measurement device for measuring a state of at least one of the computation qubits; and a shift register comprising a plurality of individual registers, wherein at least one register is communicatively coupled to each computation qubit and at least one register is communicatively coupled to the measurement device.

At least one of the computation qubits may be a superconducting qubit, for example a superconducting flux qubit, superconducting charge qubit, superconducting phase qubit, or superconducting hybrid qubit. The measurement device may include a magnetometer. The shift register may include a superconducting shift register. In embodiments that include a superconducting shift register, the superconducting shift register may include a flux-based superconducting shift register comprising: a set of administration latch qubits, each of the administration latch qubits communicatively coupled to receive administration clock signals; a first set of dummy latch qubits, each of the dummy latch qubits of the first set of dummy latch qubits communicatively coupled to receive first dummy clock signals; and a second set of dummy latch qubits, each of the dummy latch qubits of the second set of dummy latch qubits communicatively coupled to receive second dummy clock signals, wherein for each pair of successive ones of the administration latch qubits in the set of administration latch qubits, a respective one of the dummy latch qubits from the first set of latch qubits and a respective one of the dummy latch qubits from the second set of dummy latch qubits are positioned to couple flux between the administration latch qubits of the pair of successive ones of the administration latch qubits; wherein a first administration latch qubit in the flux-based superconducting shift register is coupled to receive a first input signal from a first computation qubit and a second administration latch qubit in the flux-based superconducting shift register is coupled to receive a second input signal from a second computation qubit. A third administration latch qubit in the flux-based superconducting shift register may be coupled to send an output signal to the measurement device. The administration clock signals, the first dummy clock signals, and the second dummy clock signals may each be at an approximately adiabatic frequency. The superconducting readout system may further include at least one mediating latch qubit that is communicatively coupled in series between the first computation qubit and the first administration latch qubit, such that the at least one mediating latch qubit mediates the communicative coupling between the first computation qubit and the first administration latch qubit. Each mediating latch qubit may be communicatively coupled to receive an approximately adiabatic clock signal. The superconducting readout system may further include at least one mediating latch qubit that is communicatively coupled in series between the third administration latch qubit and the measurement device such that the at least one mediating latch qubit mediates the communicative coupling between the third administration latch qubit and the measurement device, wherein the at least one mediating latch qubit is communicatively coupled to receive an approximately adiabatic clock signal.

At least one embodiment may be summarized as a method of reading out a state of a computation qubit, the method including coupling a state signal from the computation qubit to a first latch qubit; coupling a first clock signal to a compound Josephson junction in the first latch qubit; and using the first clock signal to control the coupling of the state signal between the computation qubit and the first latch qubit.

The method may further include coupling the state signal from the first latch qubit to a measurement device; and using the first clock signal to control the coupling of the state signal between the first latch qubit and the measurement device.

At least one embodiment may be summarized as a method of reading out a state of each computation qubit in a plurality of computation qubits, the method including coupling a respective signal from each of the computation qubits into a respective register in a shift register; shifting the signals along the shift register; and coupling the signals from at least one register in the shift register to at least one measurement device. In some embodiments, the shift register may include a superconducting shift register.

Coupling a respective signal from each of the computation qubits into a respective register in a superconducting shift register may include coupling the signals into respective registers of a flux-based superconducting shift register that is comprised of latch qubits. The method may further include mediating the coupling of the signal from at least one of the computation qubits into the respective register in the superconducting shift register through at least one mediating latch qubit. The method may further include mediating the coupling of the signal from at least one of the registers to the measurement device through at least one mediating latch qubit. The coupling and shifting may include applying a set of clock signal pulses to the registers in the superconducting shift register.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
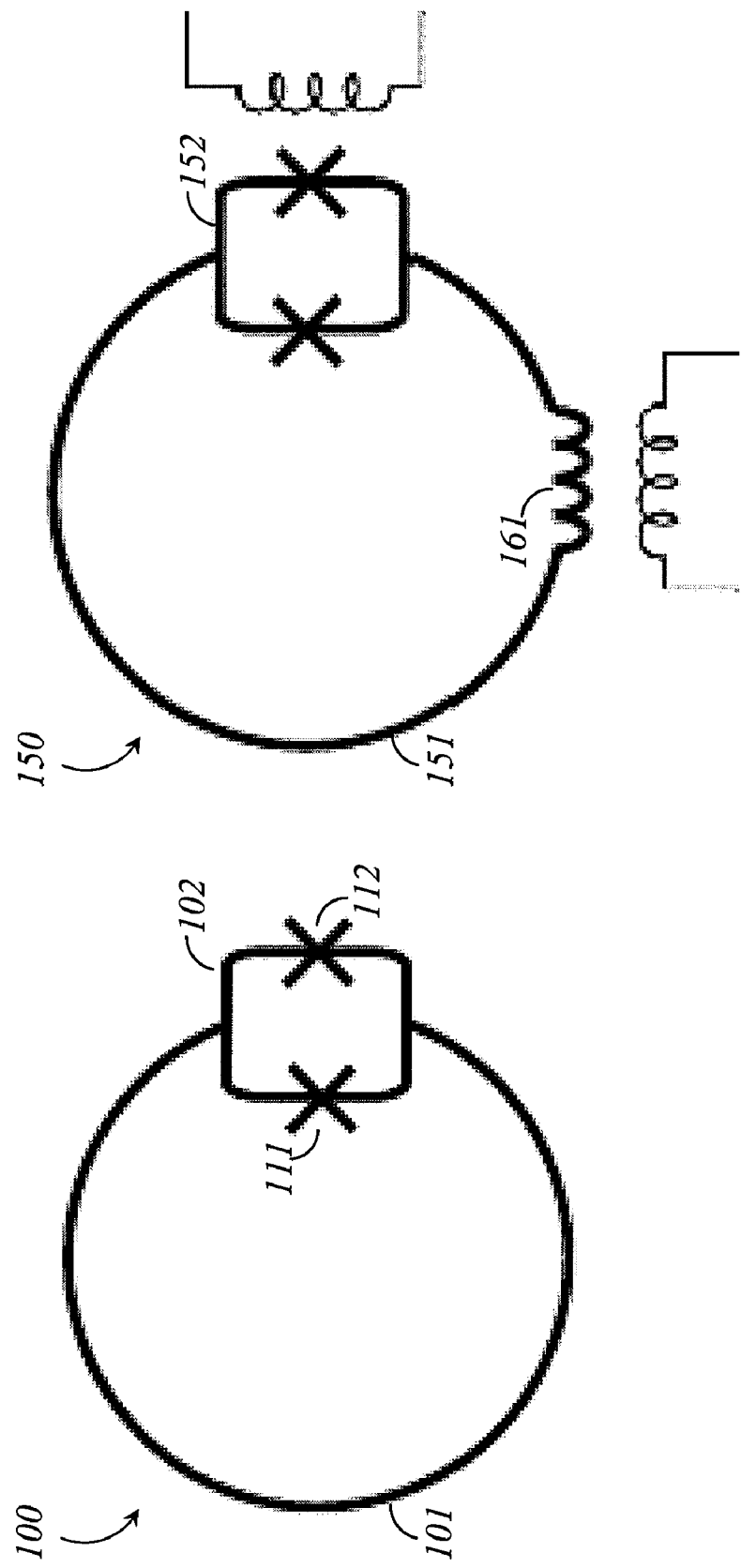
FIG. 1A is a schematic diagram of a superconducting circuit that may be implemented as a superconducting flux qubit.
FIG. 1B is a schematic diagram of an alternative superconducting circuit that may also be implemented as a superconducting flux qubit.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Furthermore, certain figures herein depict various voltage and current waveforms. These waveforms are intended to be illustrative for purposes of understanding operation of embodiments, and are not intended to be drawn to scale and/or to precisely and accurately depict waveform behavior in terms of shape, amplitude, duty cycle, frequency, distortion, or other characteristics.

The present systems, methods and apparatus describe techniques for reading out the state of at least one component in a superconducting quantum processor. These techniques implement readout systems that incorporate superconducting latch qubits. At least one component of a superconducting quantum processor that is read out may include a superconducting qubit. The present systems, methods and apparatus represent an improvement over existing techniques for reading out the states of qubits in a superconducting quantum processor by reducing the impact of an isolated readout operation on the rest of the quantum processor.

Many existing techniques for reading out the state of a qubit in a superconducting quantum processor involve directly measuring the state of the qubit. For example, a magnetometer such as a dc-SQUID may be used to directly measure the state of a superconducting flux qubit. However, readout schemes that rely on direct measurements of qubit states may result in "readout destruction", whereby the physical act of observing the state of a qubit affects the classical state of the other qubits in the quantum processor. The problem of readout destruction is well known in the art. An additional drawback of such direct measurement techniques is that noise in the measurement device may be inadvertently coupled into the qubit. In the case of a dc-SQUID being directly coupled to a superconducting flux qubit, noise may pass from the dc-SQUID to the superconducting flux qubit while a measurement is being made, or even while a measurement is not being made if the coupling between the two devices remains active. Furthermore, the dc-SQUID itself may be highly susceptible to noise and may not be an ideal device in which to store a small signal in a noisy environment.

As discussed, the fundamental unit of quantum computation is the qubit. Superconducting qubits may take a variety of forms, including the superconducting flux qubit. A superconducting flux qubit may be realized in the form of a superconducting loop that contains at least one switching device known as a Josephson junction. A quantum processor may then comprise any number of such superconducting loops and Josephson junctions. FIG. 1A is a schematic diagram of a basic circuit 100 that may be implemented as a superconducting flux qubit. Circuit 100 comprises a first superconducting loop 101 that is interrupted by a second superconducting loop 102, which is itself interrupted by two Josephson junctions 111 and 112. Superconducting loop 101 is referred to hereinafter as the "qubit loop" while superconducting loop 102 is referred to as the "compound Josephson junction," or "CJJ." Those of skill in the art will appreciate that an rf-SQUID-approximation of circuit 100 may be drawn where CJJ 102 and Josephson junctions 111 and 112 are all replaced by one Josephson junction, or similarly any number of Josephson junctions may be used in CJJ 102.

Figure 2:
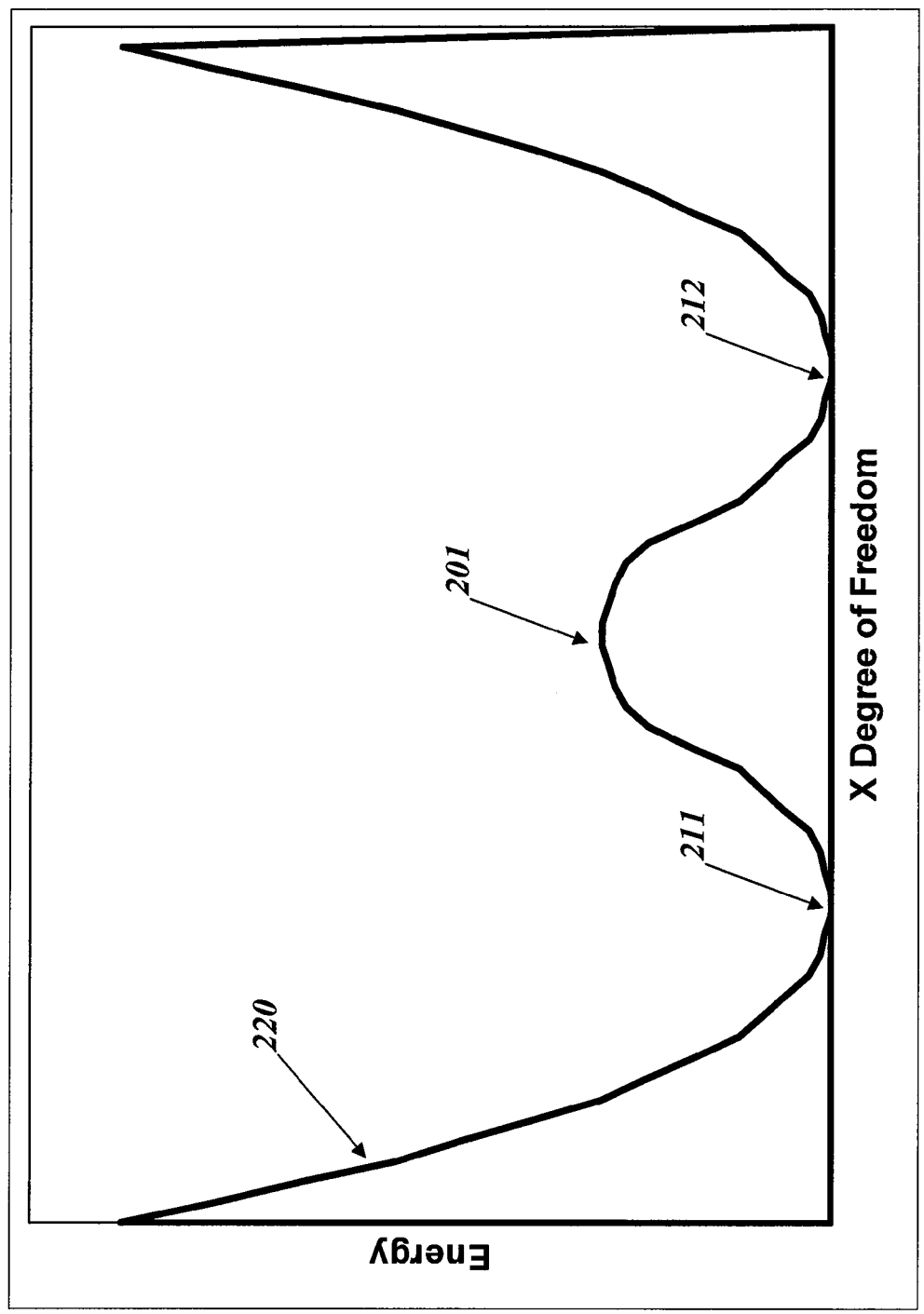
FIG. 2 is an approximate graph showing the general shape of the potential energy curve that may be produced by a superconducting flux qubit.

In operation, the superconducting flux qubit of circuit 100 may communicate with other devices by inductive coupling. For example, FIG. 1B is a schematic diagram of another circuit 150 that may be implemented as a superconducting flux qubit. Note that FIG. 1B represents a one-qubit system and communication with other qubits, though possible, is not shown. In circuit 150, qubit loop 151 contains an inductor 161 and is inductively coupled to a signal line. Similarly, CJJ 152 is also inductively coupled to a separate signal line. The coupling scheme in circuit 150 may be used to control the energy of the superconducting flux qubit and establish a specific potential energy curve. FIG. 2 is an approximate graph showing the general shape of the potential energy curve that may be produced by circuit 150. A key feature is that the height of barrier 201 is controllable by the inductive coupling into CJJ 152. Similarly, the relative depths of the two wells (211 and 212) on either side of the barrier 201 are controllable by the inductive coupling into qubit loop 151.

Circuit 150 shown in FIG. 1B may be used as a superconducting flux qubit, but it also resembles an embodiment of a quantum flux parametron (QFP). As an element of computation, the structure of a superconducting flux qubit (as illustrated in FIGS. 1A and 1B) may be operated as a "computation qubit." For the purposes of the present systems, methods and apparatus, the term "computation qubit" is used to refer to a qubit structure that is used as an element of computation in a quantum processor. That is, a computation qubit is evolved from an initial state to a final state in accordance with the computation algorithm. As a logic device, a superconducting flux qubit may be operated as a latch qubit, as outlined in U.S. Provisional Patent Application Ser. No. 60/913,980, filed Apr. 25, 2007, and entitled "Adiabatic Superconducting Qubit Logic Devices And Methods" and U.S. patent application Ser. No. 12/109,847. The concept of latching in classical electrical circuits is roughly analogous to the non-classical latching described herein. Throughout this specification and the appended claims, to "latch" a magnetic signal refers to the process of loading an instantaneous signal, retaining the instantaneous signal despite perturbations or evolutions in the source signal, and continuously outputting the instantaneous signal until the latching is quenched. Thus, the term "latch qubit" is used herein to denote a device that implements this process, while the term "computation qubit" is used herein to denote a qubit that is evolved to perform quantum computation.

The general structure of a superconducting flux qubit illustrated in FIGS. 1A and 1B may be implemented as either a computation qubit or a latch qubit. However, the design parameters of a computation qubit may differ from those of a latch qubit, such that a qubit structure designed for computation operations may be unsuitable for latching operations and a qubit structure designed for latching operations may be unsuitable for computation operations. In the various embodiments described herein, a computation qubit may be structurally and parametrically designed to specifically perform computation operations. Similarly, a latch qubit may be structurally and parametrically designed to specifically perform latching operations. In comparison to a computation qubit, the parameters of a latch qubit may generally include larger Josephson junctions, a smaller loop in the CJJ, and a larger $\beta_{max}$. The parameters of a computation qubit may be designed to facilitate quantum tunneling and the realization of superposition states, whereas the parameters of a latch qubit may be designed to facilitate isolation between states.

Figure 3:
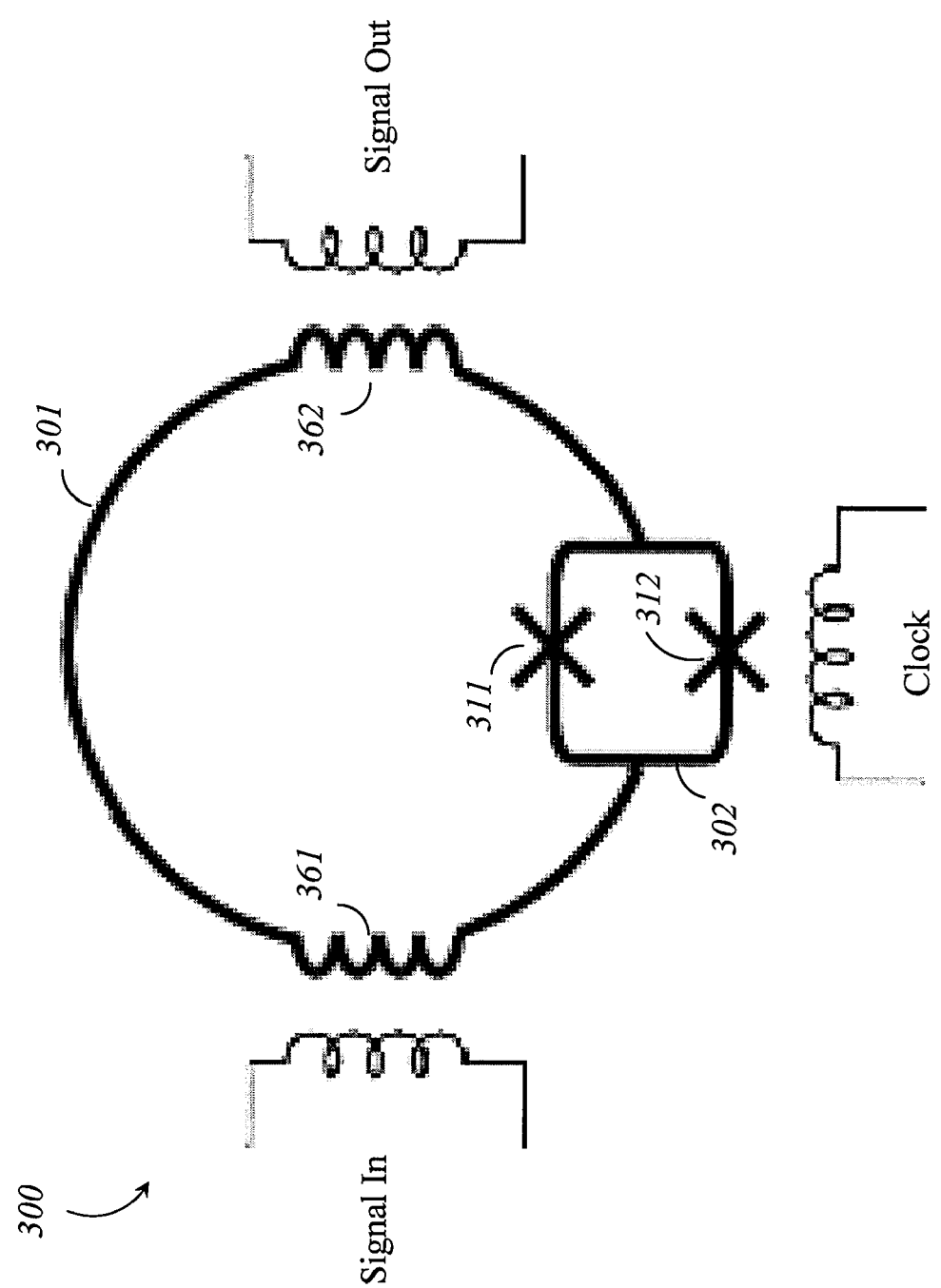
FIG. 3 is a schematic diagram of an embodiment of a superconducting flux qubit being operated as a latch qubit.

FIG. 3 is a schematic diagram of an embodiment of a superconducting flux qubit being operated as a latch qubit 300. Similar to FIGS. 1A and 1B, the circuit of latch qubit 300 comprises a qubit loop 301 and a split junction loop or CJJ 302, where CJJ 302 includes two Josephson junctions 311 and 312. Latch qubit 300 further comprises two superconducting inductors 361 and 362 for the purposes of inductively coupling with input and output signal lines 303, 305 to transfer input and output signals, respectively. In this embodiment, CJJ 302 is itself configured to inductively couple to a clock signal line 307. Clock signals on the clock signal line 307 control the operation of latch qubit 300. Throughout this specification and the appended claims, the terms "clock" and "clock signal" are frequently used to refer to a controllable signal of periodic pulses. Those of skill in the art, however, will appreciate that a controllable signal of pulses may be embodied by other signals or devices in an electric circuit or other medium (e.g., light) and the pulses need not be periodic. Thus, the terms "clock" and "clock signal" are used herein in their broadest sense and are meant to encompass all manner of administering a controllable sequence of pulses.

The schematic diagram of latch qubit 300 that is shown in FIG. 3 is intended to be illustrative and serves as an example of an embodiment. Those of skill in the art will appreciate that many alterations may be made to the circuit to accommodate specific system requirements. For example, qubit loop 301 may be of an alternate shape, such as square or rectangular; coupling to the signal lines 303, 305 may occur through an alternative means, such as via galvanic coupling; there may be more or fewer than two coupling locations on qubit loop 301; there may be more or fewer than two Josephson junctions in CJJ 302; and Josephson junctions may also be inserted in qubit loop 301. All such alterations are specific to the particular system in which the latch qubit is being implemented, while the general principles underlying the operation of a superconducting flux qubit as a latch qubit according to the present systems, methods and apparatus remain substantially unchanged.

Figure 4:
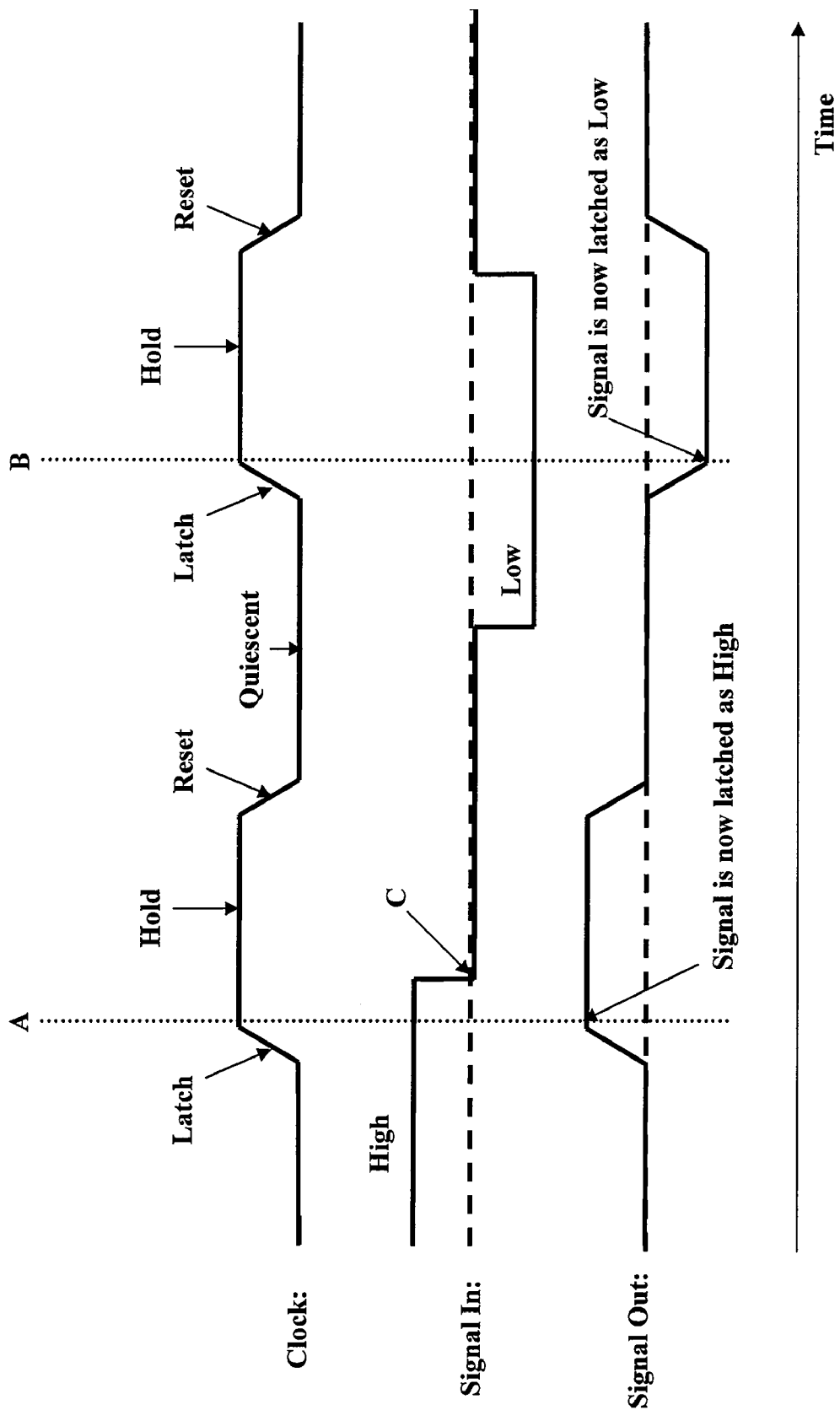
FIG. 4 is an approximate graph representing the operation of an embodiment of a latch qubit.

FIG. 4 shows an approximate graph representing a sample operation of latch qubit 300. Three concurrent signals are shown in FIG. 4: the clock signal, the input signal, and the output signal. In this embodiment, when the clock signal steps up, the latch qubit loads the input signal at that instant, holds that instantaneous signal, and transmits it to the output for the duration of the clock pulse. For example, at point A in FIG. 4 the clock pulse steps up while the signal input is high. Thus, a high signal is "latched" by the latch qubit and held for the duration of the clock pulse. While the high signal is held, the high signal appears at the signal output of the latch qubit. That is, the latch qubit holds onto the signal that it initially received when the clock pulse stepped upwards. Even if the input signal continues to evolve, the latch qubit effectively takes a picture of the input signal when the clock pulse steps upwards and that is the signal that is latched and transferred to the output. In FIG. 4, the input signal steps down at point C while the first clock pulse is still high, but the output signal remains high because that is the signal that is being held by the latch qubit. The output signal terminates as the clock pulse steps down and no signal is transmitted while the clock remains quiescent. At point B, the clock pulse again steps up, this time while the input signal is low. Thus, a low signal is latched and continuously output by the latch qubit until the clock pulse steps back down again.

The approximate graphs shown in FIG. 4 represent an illustrative embodiment of the operation of a latch qubit. In other embodiments, latching in the latch qubit may be triggered by a downwards step in the clock pulse. While the timing of the latching is governed by the clock frequency, the exact manner in which latching is triggered depends on the range of magnitudes covered by the clock pulses and the signal biases applied to the latch qubit. The clock pulse may be used to alter the shape of the potential energy curve of the system. The input signal applied to a latch qubit is "quenched" when the potential energy curve of the system resembles a parabolic or "U" shape. The input signal applied to a latch qubit is "latched" when the potential energy curve of the system resembles the "W" shape as shown in FIG. 2. The clock pulse may be used to raise a barrier (such as barrier 201 in FIG. 2) in the potential energy curve of the system, thereby producing the "W" shaped potential energy curve and triggering the latching.

The latching occurs because the ground state of the latch qubit is aligned with the external field, and the adiabatic barrier raising keeps the system in the ground state. Thus, controlled adiabatic evolution is desired in the operation of the latch qubits described in the present systems, methods and apparatus. This means that in many systems, the clock signal should operate at a frequency below about 20 GHz. Operating in this frequency range is of benefit in that it allows the state of the system to stabilize without incorporating shunt resistors on the Josephson junctions. The latch qubit produces less heat than single flux quantum (SFQ) devices and is therefore a useful logic device for systems that operate at millikelvin temperatures and are highly sensitive to thermal noise.

The latch qubit holds the instantaneous input signal loaded at the moment the clock signal pulses and establishes the barrier in the potential energy curve. In practice, however, the latched signal may be slightly affected by fluctuations in the input signal that occur while the barrier remains (that is, for the duration of the clock pulse). These effects may occur, for example, due to crosstalk within the device and with other nearby devices. The effects of crosstalk must be taken into account when operating superconducting flux qubits as latch qubits.

The present systems, methods and apparatus describe the use of latch qubits in reading out the state of at least one computation qubit. Latch qubits may be able to facilitate the readout of a computation qubit in a quiet, non-destructive way that reduces or eliminates excess coupling of noise from the measuring system to the computation qubit. In an embodiment, a latch qubit may be used to mediate the coupling between a computation qubit and a measurement device.

Figure 5:
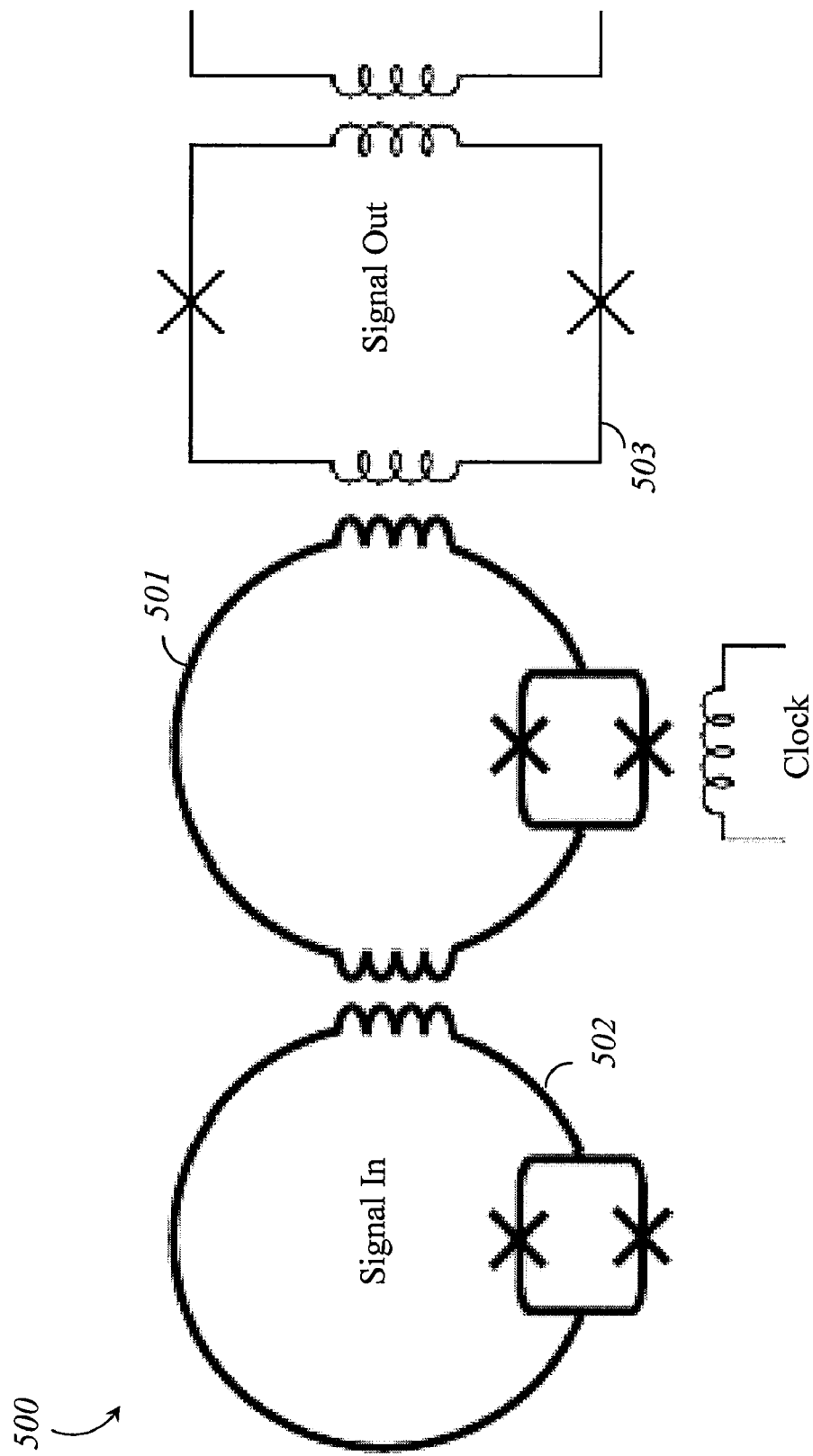
FIG. 5 is a schematic diagram of an embodiment of a readout system in which a latch qubit is used to mediate the coupling between a computation qubit and a dc-SQUID magnetometer.

FIG. 5 is a schematic diagram of an embodiment of a readout system 500 in which a latch qubit 501 is used to mediate the coupling between a computation qubit 502 and a dc-SQUID magnetometer 503. Those of skill in the art will appreciate that a latch qubit may similarly be used to mediate the coupling between many different types of superconducting qubits and measurement devices. By comparison with FIG. 3, in FIG. 5 computation qubit 502 provides the signal input into the left side of latch qubit 501, and magnetometer 503 receives the signal output from the right side of latch qubit 501. The signal input into latch qubit 501 from computation qubit 502 may induce a circulating current in the qubit loop of latch qubit 501. It is this circulating current that may ultimately be measured by magnetometer 503 as a representation of the state of computation qubit 502. Those of skill in the art will appreciate that the "left-to-right" signal propagation used in the embodiment shown in FIG. 5 is intended for illustrative purposes only. The signals input to and output from the latch qubit may be positioned anywhere around the body of the latch qubit. In the embodiment shown in FIG. 5, latch qubit 501 latches the instantaneous state of computation qubit 502 when the clock signal pulses on the clock signal line 507. While the state of computation qubit 502 is latched by latch qubit 501, a signal is transmitted from latch qubit 501 to magnetometer 503 which performs the readout operation. Thus, magnetometer 503 reads the state of computation qubit 502 indirectly by measuring a signal from latch qubit 501 after the state of computation qubit 502 has been latched. Using at least one latch qubit to mediate the coupling between a computation qubit and a state-measuring device provides a level of isolation between the computation qubit and the measurement device. This isolation can reduce the coupling of noise from the measurement device into the computation qubit. The level of isolation may be increased by increasing the number of mediating latch qubits in the readout system. For instance, the coupling between computation qubit 502 and magnetometer 503 may be mediated by a plurality of latch qubits that are coupled in series with each other. Those of skill in the art will appreciate that any number of latch qubits may be coupled together in series to mediate the coupling between a computation qubit and a measurement device, depending on the level of isolation desired in the system.

US Patent Publication 2006-0248618 describes a similar technique of reading out the state of a first qubit by transferring the state to a second qubit and then reading out the transferred state from the second qubit. However, the implementation of dedicated latch qubits in reading out the states of dedicated computation qubits as described in the present systems, methods and apparatus may realize additional benefits not seen in US Patent Publication 2006-0248618. By separating the computation and latching operations such that an individual qubit may not be required to perform both operations, the parameters of a computation qubit may be better designed to perform computation operations and the parameters of a latch qubit may be better designed to perform latching (and readout) operations. For instance, a dedicated latch qubit may be designed to achieve a higher central barrier in its potential energy curve compared to a dedicated computation qubit. This high central barrier may allow a latched classical state to be stored for relatively long periods of time without significant degradation and may serve to reduce the influence of noise during a readout operation. In the various embodiments described herein, a latch qubit is generally more robust against noise and readout back-action compared to a computation qubit.

A further advantage of the implementation of dedicated latch qubits is that, in some embodiments, readout system 500 shown in FIG. 5 may be used to amplify a flux signal coupled from computation qubit 502 to magnetometer 503. Amplification of a signal coming from computation qubit 502 prior to readout may help to better resolve the signal and make the readout signal more robust against noise. In an embodiment of readout system 500, the clock signal applied to the CJJ of latch qubit 501 may be approximately constant, for example, with a value of $\sim\Phi_o$ or greater. In this regime, latch qubit 501 may act as a flux amplifier. Depending on the parameters of the devices that comprise latch qubit 501 (such as, for example, the critical currents of the Josephson junctions and their inductances) the circulating current induced in the qubit loop of latch qubit 501 may become greater than the input signal coming from computation qubit 502. Since it is the circulating current in the qubit loop of latch qubit 501 that may ultimately be measured by magnetometer 503, the signal coming from computation qubit 502 may effectively be amplified. Those of skill in the art will appreciate that the level of amplification may be controlled by accordingly selecting the design parameters for the various devices that comprise latch qubit 501.

In some embodiments, positive amplification of the flux signal coupled from computation qubit 502 to magnetometer 503 through latch qubit 501 may be achieved if the mutual inductance M between computation qubit 502 and latch qubit 501 times the susceptibility X of latch qubit 501 is greater than 1. That is, latch qubit 501 may achieve positive flux amplification if:

$$MX \geq 1.$$

In similar embodiments, a latch qubit may be used as a tunable transformer between various components in a superconducting system, such as for example a superconducting quantum processor. Thus, latch qubit 501 may mediate the coupling between computation qubit 502 and magnetometer 503 and, in doing so, control the magnitude of the signal that is coupled from computation qubit 502 to magnetometer 503.

In other embodiments, the present systems, methods and apparatus describe the use of latch qubits to read out the states of a plurality of computation qubits. In such embodiments, it can be advantageous to use a set of latch qubits to construct a flux-based superconducting shift register. The plurality of computation qubits may then be latched into the shift register where the computation qubit signals may be shifted to a single measurement device for readout.

Figure 6:
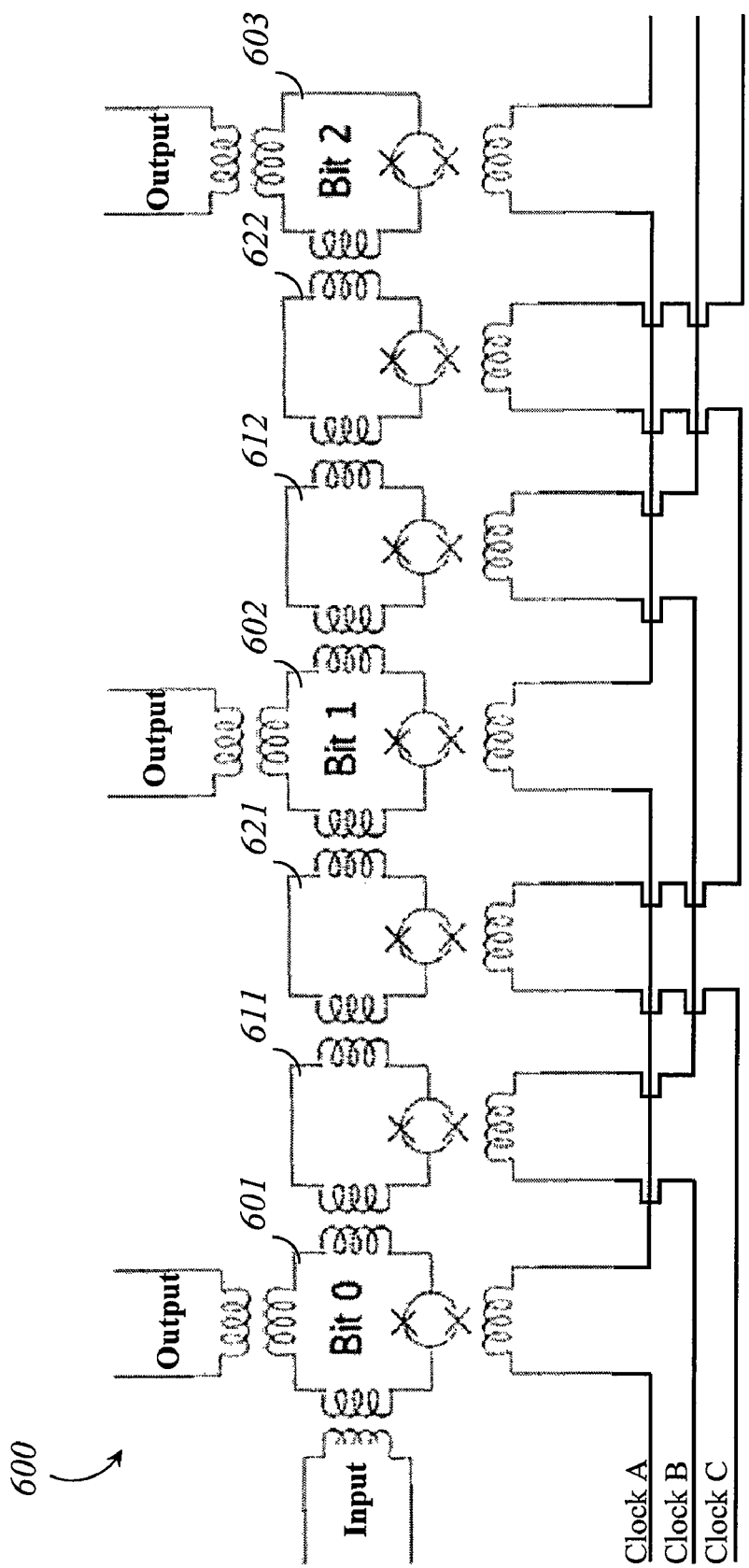
FIG. 6 is a schematic diagram of an embodiment of a flux-based superconducting shift register that uses latch qubits as its basic logic element.

FIG. 6 is a schematic diagram of an embodiment of a flux-based superconducting shift register 600 that uses latch qubits as its basic logic element. An implementation of latch qubits is described in U.S. patent application Ser. No. 12/109, 847. The structure of flux-based superconducting shift register 600 comprises a plurality of latch qubits arranged in a chain such that each latch qubit is configured to communicatively (i.e., inductively) couple to at least one neighboring latch qubit. In particular, each latch qubit in the chain is coupled to two other latch qubits in the chain, except at the beginning and end of the chain. Latch qubits that are situated at the beginning and end of a chain may each only be coupled to one other latch qubit. Though shift register 600 is drawn in FIG. 6 as a straight horizontal line, those of skill in the art will appreciate that the geometric layout of the devices may take any form to accommodate the requirements of the specific system in which the device or devices are being implemented. Those of skill in the art will appreciate that two dimensional layouts of coupled latch qubits, such as a box or a serpentine "S" pattern, may similarly be implemented.

Those of skill in the art will appreciate that a similar shift register of any resolution may be constructed by accordingly scaling the devices shown in FIG. 6. The embodiment shown in FIG. 6 uses latch qubits 601, 602, and 603 to each administer one bit of information to/from at least one device in the form of discrete magnetic flux quanta, while latch qubits 611, 612, 621, and 622 are used as "dummy latch qubits" for signal isolation and communication within shift register 600 itself. Because latch qubits 601, 602, and 603 are ultimately used to embody and administer signals, they are referred to herein as the "administration latch qubits." Those of skill in the art will appreciate that the terms "administer", "administering", "administration" and the like are used herein to encapsulate, but are not limited to, all manner of generating, managing, storing, operating upon and transferring the data signals. Thus, the term "administration latch qubit" is used herein to denote a latch qubit that is coupled to another device and thereby administers a data signal to/from the device.

Each latch qubit in shift register 600 operates in a manner similar to latch qubit 300 of FIG. 3. That is, each latch qubit in shift register 600 is coupled to an input signal, an output signal, and a clock signal. In this embodiment, shift register 600 has three distinct clock signal lines, shown as Clock A, Clock B, and Clock C in FIG. 6. An input signal is loaded and latched by each device when the corresponding clock signal pulses to establish a barrier in the potential energy curve, and the latched signal is retained for the duration of the clock pulse. In shift register 600, an input signal is propagated from left to right through the individual latch qubits in the following order: 601, 611, 621, 602, 612, 622, 603.

The exemplary shift register 600 illustrated in FIG. 6 is implemented by seven latch qubits: latch qubits 601, 602, and 603 as administration latch qubits and latch qubits 611, 612, 621, and 622 as dummy latch qubits for communication within shift register 600 itself. In this embodiment, these dummy latch qubits may be used to isolate the administration latch qubit signals from one another. Latch qubits 601, 602, and 603 are the administration latch qubits and are each used to administer signals to/from at least one device. However, due to the nature of operation of these devices, a level of isolation may be desirable between the administration latch qubits. A latch qubit, such as any of those shown in FIG. 6, may hold a signal until it is specifically quenched by the corresponding clock-pulse. Furthermore, unlike standard logic gates, signal transfer between adjacent latch qubits is not biased in a preferred direction. A signal latched in a given latch qubit may travel backwards just as well as forwards (that is, right to left just as well as left to right in FIG. 6) depending on the clock-pulse synchronization. Implementing a system where at least two dummy latch qubits separate each pair of successive administration latch qubits allows the administration latch qubits to be sufficiently isolated so that a deliberate sequence of clock pulses permits only forward propagation (i.e., left to right in FIG. 6) of the input signal. This embodiment ensures that at least one layer of quenched latch qubits may separate adjacent administration latch qubits and thus stop reverse-coupling of logic signals. Three clock signal lines are used because latch qubits are two-terminal devices. Thus, neighboring latch qubits in shift register 600 are activated at different phases and logic signals are propagated from one active device to the next adjacent activated device. If the sequence of latch qubits in FIG. 6 (that is: 601, 611, 621, 602, 612, 622, 603) is read as Admi0, Dum0, 2Dum0, Admin1, 1Dum1, 2Dum1, and Admin2, then the clock signals are coupled into shift register 600 such that Admin0, Admin1, and Admin2 are all coupled to a first clock line (Clock A); 1Dum0 and 1Dum1 are both coupled to a second clock line (Clock B); and 2Dum0 and 2Dum1 are both coupled to a third clock line (Clock C). Thus, latch qubits that are in the same relative position in the line of communicatively (e.g., inductively) coupled latch qubits are all coupled to the same clock signal line. For example, all administration latch qubits are coupled to one clock signal line, all dummy latch qubits that couple to an administration latch qubit on their left are coupled to a second clock signal line, and all dummy latch qubits that couple to an administration latch qubit on their right are coupled to a third clock signal line. As previously stated, according to the present systems, methods and apparatus shunt resistors across each Josephson junction may be omitted if, for example, each clock signal is operated at an adiabatic frequency. Furthermore, while all communicative coupling shown in FIG. 6 is inductive coupling, those of skill in the art will appreciate that alternative means of communicative coupling, such as galvanic coupling, may be used instead as appropriate in the specific application.

In some embodiments, the input signal is only administered to a given latch qubit if it coincides with a clock pulse into that device. For example, if a high input signal is coupled into latch qubit 601, the signal will be latched by latch qubit 601 only when Clock A pulses to establish a barrier in the potential energy curve. Now, if Clock B pulses during the pulse of Clock A (that is, before Clock A returns to the quenched state), then latch qubit 611 will latch the signal from latch qubit 601. Similarly, if Clock C then pulses during the pulse of Clock B (that is, before Clock B returns to the quenched state), then latch qubit 621 will latch the signal from latch qubit 611.

The embodiment of a flux-based superconducting shift register shown in FIG. 6 is illustrative and serves only as an example of one way in which latch qubits may be implemented as a shift register. Those of skill in the art will appreciate that any system implementing a different number of dummy latch qubits and/or a different number of clock signal lines may be advantageous in specific systems.

The present systems, methods and apparatus describe a specific implementation of a flux-based superconducting shift register such as shift register 600 from FIG. 6 in reading out the state of each computation qubit in a plurality of computation qubits.

Figure 7:
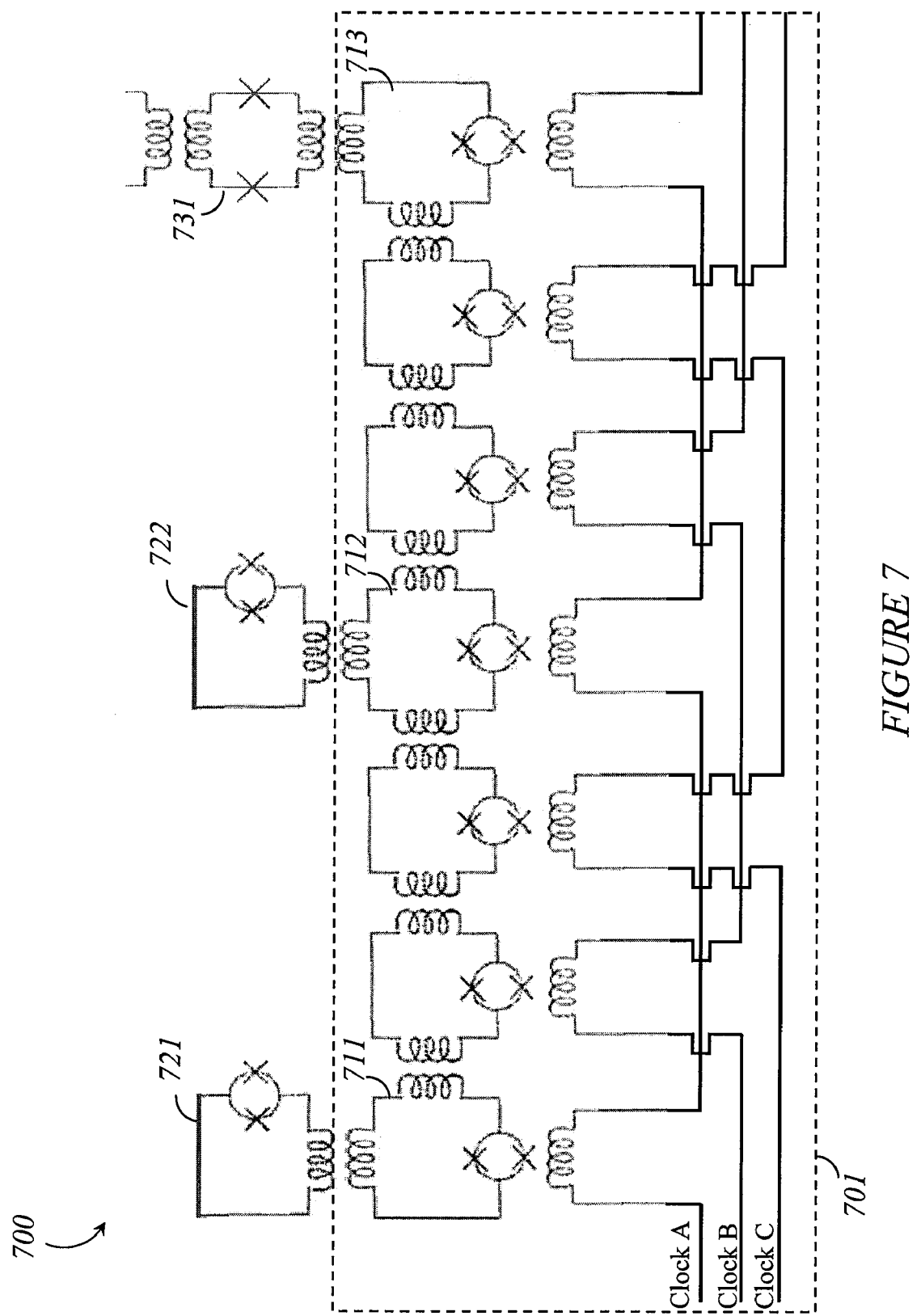
FIG. 7 is a schematic diagram of an embodiment of a readout system that uses a flux-based superconducting shift register comprised of latch qubits to read out the states of a plurality of computation qubits.

FIG. 7 is a schematic diagram of an embodiment of a readout system 700 that uses a flux-based superconducting shift register 701 comprised of latch qubits to read out the state of each computation qubit in a plurality of computation qubits. The operation of shift register 701 is very similar to that of shift register 600 from FIG. 6 except that data signals are input into shift register 701 through computation qubits 721 and 722 as opposed to through a single signal input line. In shift register 701, administration latch qubit 711 latches the state of computation qubit 721 when there is a pulse in Clock A. Similarly, administration latch qubit 712 latches the state of computation qubit 722 when there is a pulse in Clock B. By controlled pulsing of the clock signals A-C as described for shift register 600 in FIG. 6, the states of computation qubits 721 and 722 may be shifted along shift register 701 to administration latch qubit 713, where the signals are read out by a measurement device such as magnetometer 731. Thus, readout system 700 allows the readout of two computation qubits (721 and 722) through a single measurement device (magnetometer 731). Those of skill in the art will appreciate that a similar shift register design may be applied to readout the states of any number of computation qubits. The present systems, methods and apparatus may reduce the number of external signal lines required to operate a superconducting processor by performing readout of computation qubits through a flux-based superconducting shift register comprised of latch qubits. Thus, multiple measurements can be performed by a single device (such as magnetometer 731) rather than having a respective measurement device corresponding to each individual computation qubit.

In FIG. 5, mediating latch qubit 501 provides a level of isolation between computation qubit 502 and magnetometer 503. As previously discussed, the level of isolation may be increased by inserting additional mediating latch qubits in series between computation qubit 502 and magnetometer 503. Similarly, in some embodiments it may be advantageous to isolate the computation qubits from the latch qubits that comprise a flux-based superconducting shift register.

Figure 8:
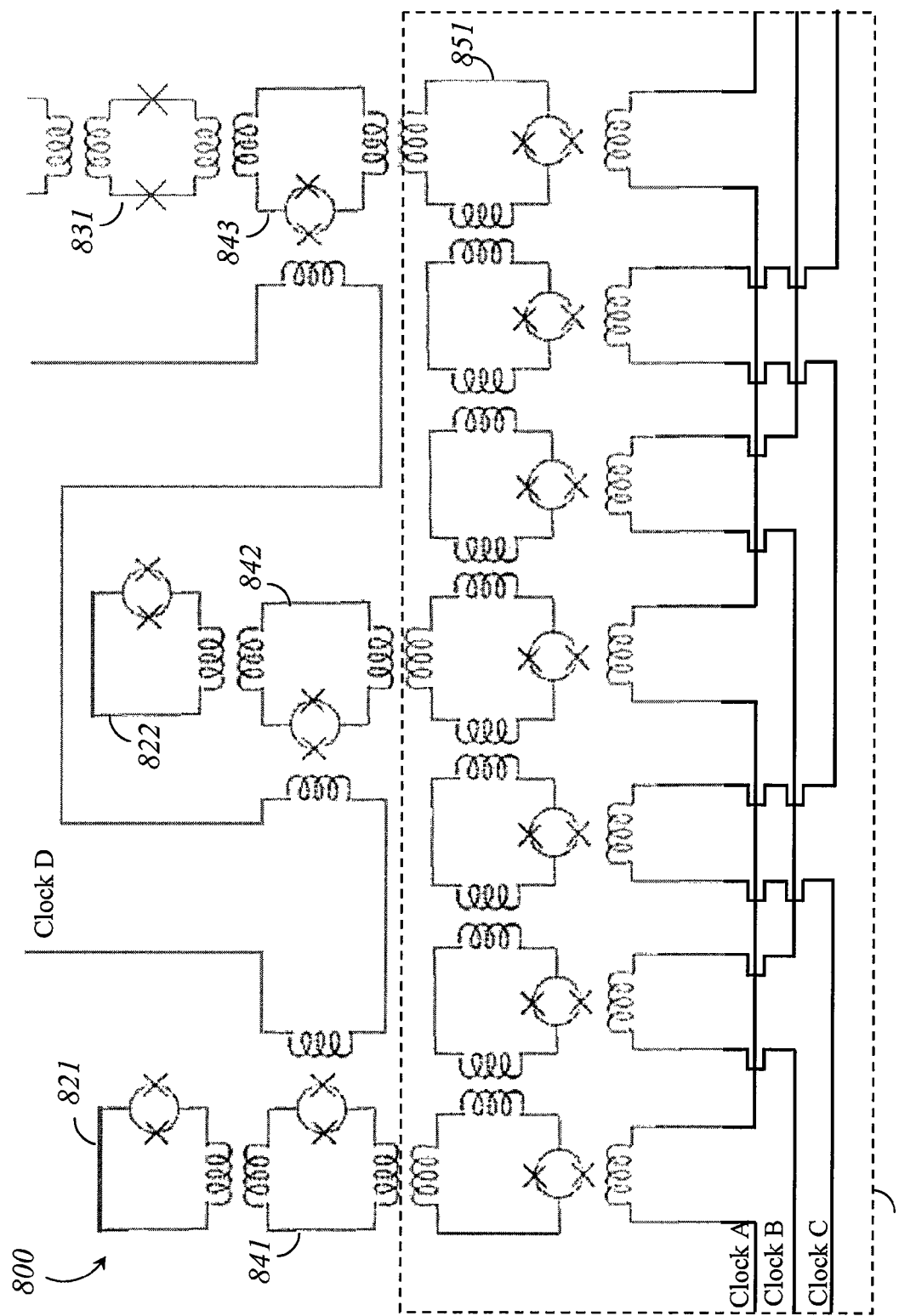
FIG. 8 is a schematic diagram of another embodiment of a readout system that may read out the states of a plurality of computation qubits by using a flux-based superconducting shift register comprised of latch qubits.

FIG. 8 is a schematic diagram of another embodiment of a readout system 800 that may read out the state of each computation qubit in a plurality of computation qubits by using a flux-based superconducting shift register 801 comprised of latch qubits. Shift register 801 operates in a similar manner to shift register 701 from FIG. 7, but readout system 800 includes mediating latch qubits 841-843 that were not included in readout system 700. Mediating latch qubit 841 may be used to mediate the coupling between computation qubit 821 and shift register 801. Similarly, mediating latch qubit 842 may be used to mediate the coupling between computation qubit 822 and shift register 801. In addition, mediating latch qubit 843 may be used to mediate the coupling between shift register 801 and a measurement device such as magnetometer 831. In readout system 800, mediating latch qubits 841-843 are all controlled by the same clock signal line, "Clock D." Thus, the states of the computation qubits are latched when the clock signal on the clock signal line Clock D pulses, and these states may then be propagated through shift register 801 in a manner similar to that describe for shift register 600 in FIG. 6. In this embodiment, a pulse on clock signal line Clock D also latches a signal or state from latch qubit 851 in shift register 801 and transmits the signal or state to magnetometer 831 for readout. Those of skill in the art will appreciate that, in some embodiments, it may be advantageous to use a different number of clock signal lines in a readout system. For instance, in some embodiments it may be advantageous to control each mediating latch qubit by its own respective clock signal, or it may be advantageous to control particular groups of mediating latch qubits by the same clock signal.

Those of skill in the art will also appreciate that, in much the same way as described for FIG. 5, any number of mediating latch qubits may be coupled in series with one another to further increase the isolation between a shift register and the computation qubits or measurement device. In embodiments that use multiple latch qubits coupled together to mediate a given coupling, it may be useful to incorporate a greater number of clock signal lines into the system. Furthermore, mediating latch qubits, such as mediating latch qubits 841-843, may each be used to amplify the signal(s) output by a respective computation qubit in a manner similar to that described for mediating latch qubit 501 from FIG. 5.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to superconducting readout systems, methods and apparatus, not necessarily the exemplary readout systems, methods, and apparatus generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/974,743, filed Sep. 24, 2007, entitled "Systems, Methods, and Apparatus for Qubit State Readout", U.S. Pat. Nos. 6,838,694, 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. patent application Ser. No. 12/109,847, and US Patent Publication 2006-0248618 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A superconducting readout system comprising:
a computation qubit;
a measurement device to measure a state of the computation qubit;
a first latch qubit comprising a qubit loop formed by a loop of superconducting material and a compound Josephson junction that interrupts the qubit loop, wherein the compound Josephson junction is formed by a closed loop of superconducting material that is interrupted by at least two Josephson junctions; and
a first clock signal input structure configured to communicatively couple clock signals to the compound Josephson junction of the first latch qubit;
wherein at least one of the computation qubit and the measurement device is configured to communicatively couple to the first latch qubit such that the first latch qubit mediates a communicative coupling between the computation qubit and the measurement device.

2. The superconducting readout system of claim 1 wherein the computation qubit is a superconducting qubit selected from the group consisting of: a superconducting flux qubit, a superconducting charge qubit, a superconducting phase qubit, and a superconducting hybrid qubit.

3. The superconducting readout system of claim 1 wherein the measurement device includes a magnetometer.

4. The superconducting readout system of claim 1 wherein the communicative coupling between the first latch qubit and at least one of the computation qubit and the measurement device includes inductive coupling.

5. The superconducting readout system of claim 1 wherein the first clock signal input structure is configured to couple a clock signal at an approximately adiabatic frequency.

6. The superconducting readout system of claim 5 wherein the adiabatic frequency is below about 20 GHz.

7. The superconducting readout system of claim 1 wherein an approximately constant clock signal is applied to the compound Josephson junction of the first latch qubit and the parameters of the at least two Josephson junctions in the compound Josephson junction are selected such that a signal that is coupled to the qubit loop of the first latch qubit produces a corresponding signal of greater magnitude that is coupled from the qubit loop of the first latch qubit.

8. The superconducting readout system of claim 1, further comprising at least one additional latch qubit configured to communicatively couple in series with the first latch qubit, wherein the computation qubit is configured to communicatively couple to the first latch qubit and the measurement device is configured to communicatively couple to the at least one additional latch qubit such that the first latch qubit and the at least one additional latch qubit both mediate the communicative coupling between the computation qubit and the measurement device.

9. The superconducting readout system of claim 8 wherein the first latch qubit and the at least one additional latch qubit are each configured to communicatively couple to a respective adiabatic clock signal line.

10. A superconducting readout system comprising:
a plurality of computation qubits;
a measurement device for measuring a state of at least one of the computation qubits; and
a shift register comprising a plurality of individual registers, wherein at least one respective register is configured to communicatively couple to each computation qubit and at least one register is configured to communicatively couple to the measurement device.

11. The superconducting readout system of claim 10 wherein at least one of the computation qubits is a superconducting qubit selected from the group consisting: of a superconducting flux qubit, a superconducting charge qubit, a superconducting phase qubit, and a superconducting hybrid qubit.

12. The superconducting readout system of claim 10 wherein the measurement device includes a magnetometer.

13. The superconducting readout system of claim 10 wherein the shift register includes a superconducting shift register.

14. The superconducting readout system of claim 13 wherein the superconducting shift register includes a flux-based superconducting shift register comprising:
a set of administration latch qubits, each of the administration latch qubits configured to receive administration clock signals via communicative coupling;
a first set of dummy latch qubits, each of the dummy latch qubits in the first set of dummy latch qubits configured to receive first dummy clock signals via communicative coupling; and
a second set of dummy latch qubits, each of the dummy latch qubits of the second set of dummy latch qubits configured to receive second dummy clock signals via communicative coupling, wherein for each pair of successive ones of the administration latch qubits in the set of administration latch qubits, a respective one of the dummy latch qubits from the first set of dummy latch qubits and a respective one of the dummy latch qubits from the second set of dummy latch qubits are positioned to couple flux between the administration latch qubits of the pair of successive ones of the administration latch qubits;

wherein a first administration latch qubit in the flux-based superconducting shift register is configured to receive a first input signal from a first computation qubit and a second administration latch qubit in the flux-based superconducting shift register is configured to receive a second input signal from a second computation qubit.

15. The superconducting readout system of claim 14 wherein a third administration latch qubit in the flux-based superconducting shift register is configured to send an output signal to the measurement device.

16. The superconducting readout system of claim 15, further comprising at least one mediating latch qubit that is configured to communicatively couple in series between the third administration latch qubit and the measurement device such that the at least one mediating latch qubit is configured to mediate a communicative coupling between the third administration latch qubit and the measurement device, wherein the at least one mediating latch qubit is configured to receive an approximately adiabatic clock signal via communicative coupling.

17. The superconducting readout system of claim 14 wherein the administration clock signals, the first dummy clock signals, and the second dummy clock signals are each at an approximately adiabatic frequency.

18. The superconducting readout system of claim 14, further comprising at least one mediating latch qubit that is configured to communicatively couple in series between the first computation qubit and the first administration latch qubit, such that the at least one mediating latch qubit is configured to mediate a communicative coupling between the first computation qubit and the first administration latch qubit.

19. The superconducting readout system of claim 18 wherein each mediating latch qubit is configured to receive an approximately adiabatic clock signal via communicative coupling.

20. The superconducting readout system of claim 14, further comprising:
a first clock signal line configured to communicatively couple clock signals to each administration latch qubit in the set of administration latch qubits;
a second clock signal line configured to communicatively couple clock signals to each dummy latch qubit in the first set of dummy latch qubits; and
a third clock signal line configured to communicatively couple clock signals to each dummy latch qubit in the second set of dummy latch qubits.

21. A method of reading out a state of a computation qubit, the method comprising:
coupling a state signal from the computation qubit to a first latch qubit;
coupling a first clock signal to a compound Josephson junction in the first latch qubit;
using the first clock signal to control the coupling of the state signal between the computation qubit and the first latch qubit;
coupling the state signal from the first latch qubit to a measurement device; and
using the first clock signal to control the coupling of the state signal from the first latch qubit to the measurement device.

22. The method of claim 21 wherein coupling the state signal from the first latch qubit to a measurement device includes:
coupling the state signal from the first latch qubit to a set of serially-coupled latch qubits, wherein the set of serially-coupled latch qubits comprises at least two latch qubits and each latch qubit in the set of serially-coupled latch qubits is coupled to a respective clock signal line;
using clock signals on the respective clock signal lines to control a propagation of the state signal through the set of serially-coupled latch qubits;
coupling the state signal from a last latch qubit in the set of serially-coupled latch qubits to the measurement device; and
using a clock signal that corresponds to the last latch qubit in the set of serially-coupled latch qubits to control the coupling between the last latch qubit and the measurement device.

23. A method of reading out a state of each computation qubit in a plurality of computation qubits, the method comprising:
coupling a respective signal from each computation qubit into a respective register in a shift register;
shifting the signals between adjacent registers within the shift register; and
coupling the signals from at least one register in the shift register to at least one measurement device.

24. The method of claim 23 wherein coupling a respective signal from each computation qubit into a respective register in a shift register includes coupling the signals into respective registers of a superconducting shift register.

25. The method of claim 24 wherein coupling a respective signal from each computation qubit into a respective register in a superconducting shift register includes coupling the signals into respective registers of a flux-based superconducting shift register that is comprised of latch qubits.

26. The method of claim 23, further comprising mediating the coupling of the signal from at least one of the computation qubits into the respective register in the shift register through at least one mediating latch qubit.

27. The method of claim 26 wherein mediating the coupling includes applying a set of clock signal pulses to the at least one mediating latch qubit.

28. The method of claim 23, further comprising mediating the coupling of the signal from at least one of the registers to the measurement device through at least one mediating latch qubit.

29. The method of claim 28 wherein mediating the coupling includes applying a set of clock signal pulses to the at least one mediating latch qubit.

30. The method of claim 23 wherein the coupling and shifting each include applying a set of clock signal pulses to the registers in the shift register.

* * * * *